(12) United States Patent
Clebsch et al.

(10) Patent No.: US 12,056,512 B2
(45) Date of Patent: Aug. 6, 2024

(54) SECURE COMPUTING MECHANISM

(71) Applicant: Microsoft Technology Licensing, LLC, Redmond, WA (US)

(72) Inventors: Sylvan Clebsch, Cambridge (GB); Stavros Volos, Cambridge (GB); Sean Allen, New York City, NY (US); Antonio Nino Diaz, Cambridge (GB); John Starks, Seattle, WA (US); Kenneth Gordon, London (GB); Manuel Costa, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 518 days.

(21) Appl. No.: 17/357,999

(22) Filed: Jun. 25, 2021

(65) Prior Publication Data

US 2022/0413883 A1   Dec. 29, 2022

(51) Int. Cl.
*G06F 9/455* (2018.01)
*G06F 9/445* (2018.01)
(Continued)

(52) U.S. Cl.
CPC ...... *G06F 9/45545* (2013.01); *G06F 9/44505* (2013.01); *G06F 9/45558* (2013.01);
(Continued)

(58) Field of Classification Search
CPC .................................................. G06F 9/45545
See application file for complete search history.

(56) References Cited

U.S. PATENT DOCUMENTS

| 6,021,438 A * | 2/2000 | Duvvoori .............. G06F 21/105 |
| | | 712/210 |
| 10,776,459 B2 | 9/2020 | Bojireddy et al. |
| | (Continued) | |

FOREIGN PATENT DOCUMENTS

| EP | 3367287 A1 | 8/2018 |
| WO | 2020106973 A1 | 5/2020 |

OTHER PUBLICATIONS

"AMD Secure Encrypted Virtualization (SEV)", Retrieved from: https://web.archive.org/web/20190425152806/https:/developer.amd.com/sev/, Apr. 25, 2019, 4 Pages.
(Continued)

*Primary Examiner* — Charlie Sun
(74) *Attorney, Agent, or Firm* — Barta Jones, PLLC

(57) ABSTRACT

A system comprising a hosting service configured to perform: providing, to a trusted entity on a central processing unit, a command for a launch of a virtual machine (VM); assigning, to the VM, at least a portion of memory for the guest operating system; submitting, to the trusted entity, a request to measure an address space of the VM to provide a measurement digest of the address space of the guest operating system; including, in a configuration object, a policy provided by the user for the service logic, wherein the policy defines one or more rules for the service logic, wherein the one or more rules include at least one rule for which containers may run in the guest operating system; hashing the policy to provide a hash digest of the policy; submitting, to the trusted entity, the hash digest of the policy; and completing the launch of the VM.

20 Claims, 5 Drawing Sheets

(51) Int. Cl.
*H04L 9/08* (2006.01)
*H04L 9/32* (2006.01)

(52) U.S. Cl.
CPC .......... *H04L 9/0825* (2013.01); *H04L 9/0861* (2013.01); *H04L 9/3213* (2013.01); *H04L 9/3247* (2013.01); *G06F 2009/45583* (2013.01); *G06F 2009/45587* (2013.01)

(56) References Cited

U.S. PATENT DOCUMENTS

| | | | |
|---|---|---|---|
| 10,970,103 | B2 | 4/2021 | Smith et al. |
| 2009/0169017 | A1 | 7/2009 | Smith et al. |
| 2009/0249053 | A1 | 10/2009 | Zimmer et al. |
| 2020/0250319 | A1 | 8/2020 | Bacher et al. |
| 2021/0133312 | A1 | 5/2021 | Sugandhi et al. |

OTHER PUBLICATIONS

"AMD SEV-SNP: Strengthening VM Isolation with Integrity Protection and More", In White Paper, Jan. 2020, pp. 1-20.
"AMD64 Technology: AMD64 Architecture Programmer's Manual, vol. 2: System Programming", Retrieved from: https://www.amd.com/system/files/TechDocs/24593.pdf, Mar. 2021, pp. 1-770.
"hcsshim", Retrieved from: https://web.archive.org/web/20210413102942/https:/github.com/Microsoft/hcsshim, Apr. 13, 2021, 3 Pages.
"Introducing the Host Compute Service (HCS)", Retrieved from: https://techcommunity.microsoft.com/t5/containers/introducing-the-host-compute-service-hcs/ba-p/382332, Mar. 21, 2019, 5 Pages.
"Linux Containers on Windows—The Inside Story", Retrieved from: https://www.youtube.com/watch?v=JZtQnYa0874, Nov. 3, 2017, 3 Pages.
"Open Guest Compute Service", Retrieved from: https://web.archive.org/web/20180604102310/https:/github.com/microsoft/opengcs, Jun. 4, 2018, 2 Pages.
Arnautov, et al., "SCONE: Secure Linux Containers with Intel SGX", In Proceedings of the 12th USENIX Conference on Operating Systems Design and Implementation, Nov. 2, 2016, pp. 689-703.
Gerend, et al., "What's new in Windows Server, versions 1903 and 1909", Retrieved from: https://docs.microsoft.com/en-us/windows-server/get-started-19/whats-new-in-windows-server-1903-1909, Jan. 28, 2020, 6 Pages.
Gowda, et al., "Confidential Containers", Retrieved from: https://docs.microsoft.com/en-us/azure/confidential-computing/confidential-containers, Feb. 11, 2020, 7 Pages.
Russinovich, et al., "Toward Confidential Cloud Computing", In Journal of Queue, vol. 19, Issue 1, Feb. 2021, pp. 1-28.
Sartakov, et al., "Spons & Shields: Practical Isolation for Trusted Execution", In Proceedings of the 17th ACM SIGPLAN/SIGOPS International Conference on Virtual Execution Environments, Apr. 16, 2021, pp. 186-200.
"International Search Report and Written Opinion Issued in PCT Application No. PCT/US22/030467", Mailed Date: Sep. 13, 2022, 10 Pages.

* cited by examiner

SECURE COMPUTING MECHANISM

TECHNICAL FIELD

The present disclosure relates to a mechanism for secure computing. In particular, a method for launching a virtual machine (VM) securely is described.

BACKGROUND

Traditionally, if an operating system (OS) runs on a hypervisor, then the hypervisor can see all the data of the OS and applications running in the OS. "See" here means able to inspect and modify all the same application data from the same region(s) of memory that the application can.

In some systems, a host OS working on a computer's underlying hardware may be used to run one or more VMs each operating a guest OS. Within each guest OS, one or more containers may be executed. A container may be considered to comprise a collection of resources that gives a view to an application that the application is running on its own system environment. Containers may run on a guest OS. Containers may be considered to comprise software that can virtually package and isolate applications for deployment.

In traditional systems, in order to run a user's application that can read a private filesystem, it is required that the host OS and the hypervisor is trusted by the user. In some cases, this can require that a user trusts the host OS or hypervisor with access to sensitive data, such as hospital records, financial reports, or information prejudicial to national security.

SUMMARY

According to a first aspect disclosed herein, there is provided a system comprising one or more memory units. The system may also comprise a processing apparatus comprising one or more processing units configured to run service logic in a guest operating system of a virtual machine and to run a hosting service. The hosting service is configured to provide, to a trusted entity on a central processing unit of the one or more processing units, a command for a launch of the virtual machine. The hosting service is also configured to assign, to the virtual machine, at least a portion of the memory for the guest operating system. The hosting service is also configured to submit, to the trusted entity, a request to measure an address space of the virtual machine to provide a measurement digest of the address space of the guest operating system. In some examples, the measurement digest of the address space of the guest operating system may be provided by the trusted entity after the virtual machine is launched. The hosting service is also configured to include, in a configuration object, a policy provided by the user for the service logic, wherein the policy defines one or more rules for the service logic, wherein the one or more rules include at least one rule for which containers may run in the guest operating system. The hosting service is also configured to hash the policy to provide a hash digest of the policy, submitting the hash digest of the policy to the trusted entity, and then completing the launch of the virtual machine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all the disadvantages noted herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

The present disclosure relates to a system, method, and computer-readable storage device for securely launching a VM. Using a user-defined policy for containers in the VM, a user is able to encrypt filesystems and store them securely without the hypervisor or host OS being able to see the contents of the filesystems.

An example application is to cloud-based confidential computing, which is currently a growth area. The ability for customers to run complex workloads with strong guarantees that the hypervisor or host OS does not have access to their data is an important differentiator. A hypervisor or host OS may be run in a cloud-based environment. However, example applications are also foreseen in situations where neither a hypervisor nor host OS are run in the cloud.

Figure 1:
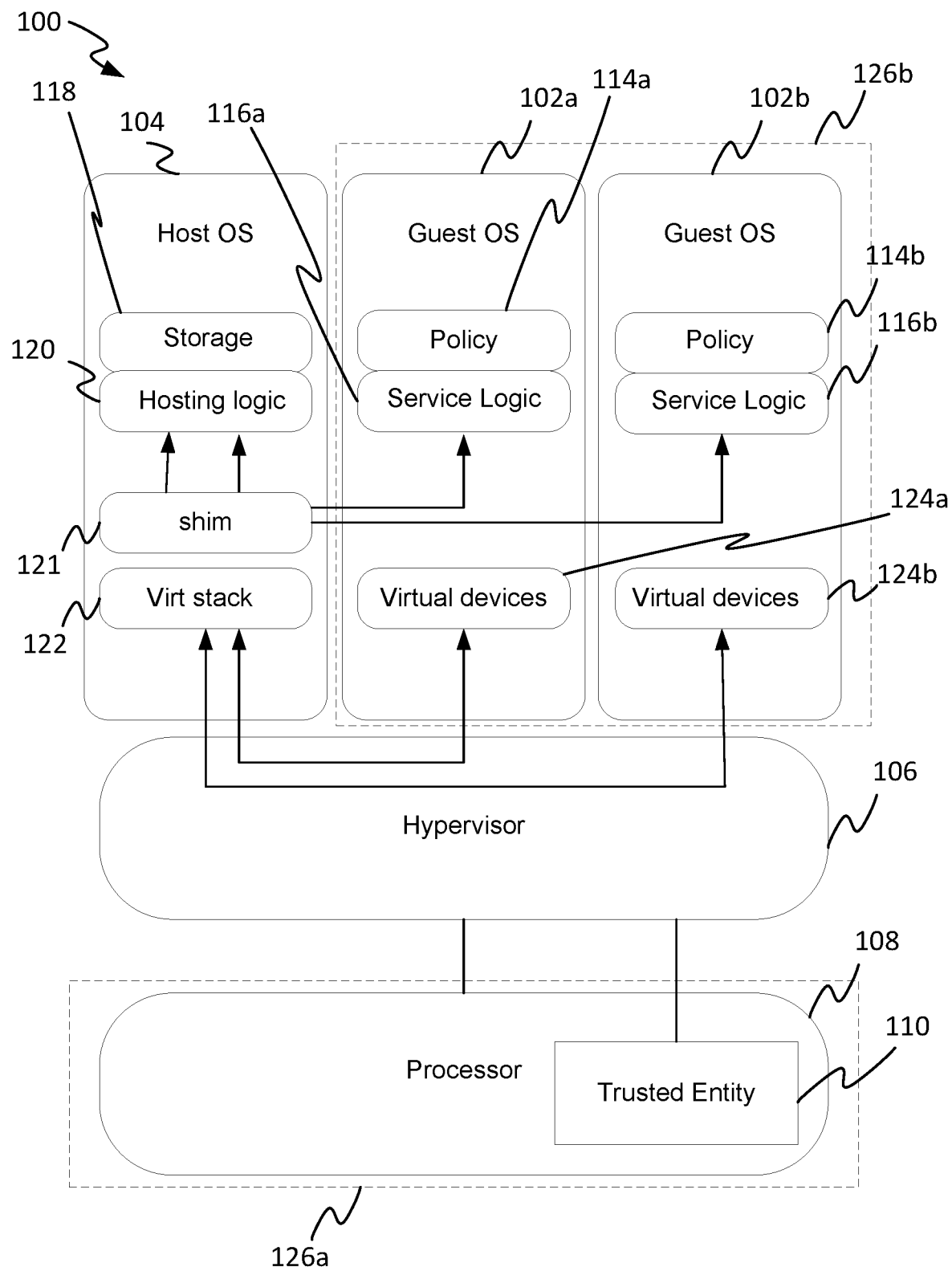
FIG. 1 is a schematic block diagram of a computing system in accordance with embodiments disclosed herein.

FIG. 1 illustrates an example architecture of a system 100 running guest OSs 102a and 102b. Although the example system 100 shows two guest OSs, guest OS 102a and guest OS 102b, it will be understood that there may be more, or fewer guest OSs included using a similar architecture.

Hypervisor 106 can be considered to be a kind of emulator, and can comprise computer software, firmware, or hardware that creates and runs VMs. Hypervisor 106 can use host OS 104 to run VMs such as guest OS 102a and guest OS 102b.

In some examples, hypervisor 106 may comprise a Microsoft Azure Hypervisor. In some examples, hypervisor 106 may be cloud-based.

Host OS 104 can be used in combination with hypervisor 106 and Hosting logic (e.g. a Host Computing Service (HCS)) 120 to provide a hosting service for guest OSs 102a and 102b. In other words, a hosting service may comprise Host OS 104, hosting logic 120 and hypervisor 106. A container manager may run in the host OS (e.g. host OS 104) and interact with a lightweight container runtime (e.g. hscshim 121) that interacts with hosting logic 120 (e.g. HCS) to create a VM. The container manager may also interact with service logic 116a or 116b via the lightweight container runtime to launch the container process. In some examples, a container runtime comprises containerd and hcsshim.

Host OS 104 operates as a first VM in the system 100. As well as hosting logic 120, Host OS 104 may also comprise a storage 118 and a virtual stack 122. In some examples, the virtual stack 122 may comprise a path that allows virtual device 124 in guest OS 102a or virtual device 124b in guest OS 102b to access a physical device attached to the host machine. Virtual stack 122 may comprise one or more services and device drivers.

Guest OS 102a and Guest OS 102b each run on further VMs in system 100. These VMs may be considered to be utility VMs. Each Guest OS comprises a service logic which can be used to communicate with hosting logic 120. In some examples, the service logic may interact with a lightweight container runtime 121 (e.g. a shim or hcsshim) to communicate with hosting logic 120. For example, Guest OS 102a comprises service logic 116a and Guest OS 102b comprises service logic 116b.

In some examples, each service logic 116a and 116 may comprise an Open Guest Compute Service (opengcs) package.

According to some examples, at least one of guest OS 126 and guest OS 126b may comprise a Linux Containers on Windows (LCOW) OS. It will be understood however that any other appropriate OS may be used.

Guest OS 102a may comprise one or more virtual devices 124a in communication with host OS 104 via virtual stack 122 of host OS. Guest OS 102b may comprise one or more virtual devices 124b in communication with host OS 104 via virtual stack 122 of host OS.

A guest OS may comprise a policy for the service logic in the guest OS. For example, guest OS 102a may be governed by one or more rules from policy 114a. Similarly, guest OS 102b may be governed by one or more rules from policy 114b. The policy in each guest OS can be used to define one or more rules for the service logic of the respective guest OS. In some examples, at least one of the one or more rules determines which containers can run in the guest OS.

The policy may be defined by user operating a guest OS. In some examples, the policy is provided by the user at the instantiation time of the respective guest OS. Examples of rules that may be included in a policy are:
 a definition for the service logic as to which containers are permitted to run in the guest OS of the VM;
 a set of hashes of container image layer file systems of the containers which are permitted to run in the guest OS of the VM;
 a command line rule for the containers which are permitted to run in the guest OS of the VM;
 a definition of a set of encrypted filesystems of the user that will be mounted during the execution of the containers which are permitted to run in the guest OS of the VM.

The policy may also enable/disable: debugging in the guest OS of the VM and logging in the guest OS of the VM.

It is envisaged that further rules could also be included in the policy. In some examples, a definition for the service logic as to which containers are permitted to run in the guest OS of the VM is enforced by a rule defining a set of hashes of container image layer file systems of the containers which are permitted to run in the guest OS of the VM.

According to some examples, the policy cannot be changed throughout the lifetime of the guest OS.

As such, the one or more rules govern which containers can run in a guest OS and how the containers can run in the guest OS.

The service logic (e.g. service logic 116a) of a guest OS (e.g. guest OS 102a) may enforce the one or more rules of the policy. For example, during an attempt to run a container, the service logic may prepare at least one encrypted read-write temporary filesystem for the at least one container. The filesystem may be integrity-protected. The service logic may then mount the one or more integrity-protected filesystems of the at least one container. The service logic may only run the at least one container if a hash of one or more filesystem layers of the at least one container is the same as the expected hash reported in the policy for the service logic. In this way, the service logic enforces a rule defining an expected hash of one or more filesystems layers.

In a further example, the service logic may enforce a command line rule for the containers which are permitted to run in the guest OS of the VM by checking if at least one run command line recorded in the policy corresponds to a runtime specification of at least one container, and only executing a container workload of the at least one container when a run command line recorded in the policy corresponds to the runtime specification of the at least one container.

In some examples, a guest OS such as guest OS 102a or guest OS 102b may run one or more containers. A group of one or more containers may be considered to be a pod. The policy for the guest OS is applicable to all pods in the guest OS.

In some examples, a container may be considered to comprise a collection of resources that gives a view to an application that the application is running on its own system environment, Containers may run on VMs such as guest OS 102a or guest OS 102b. Containers may be considered to comprise software that can virtually package and isolate applications for deployment.

In some examples, a container may comprise a Docker container.

System 100 may also comprise a processor apparatus comprising one or more processors such as processor 108. Processor 108 may comprise a Core Processing Unit (CPU) or any other suitable processor.

Although not explicitly shown in in FIG. 1, system 100 may comprise memory comprising one or more memory units. At least one of the one or more memory units may be used to run host OS 104, guest OS 102a and guest OS 102b. Host OS 104, guest OS 102a and guest OS 102b may be run by the processing apparatus of the system in combination with the at least one of the one or more memory units.

Guest OS 102a and guest OS 102 may be run using one or more memory units of system 100 and at least part of the processing apparatus of system 100. As such, service logic 116a and service logic 116b also be run be run using one or more memory units of system 100 and at least part of the processing apparatus of system 100.

A hosting service, described further below with respect to FIG. 2 for example, may run using one or more memory units of system 100 and at least part of the processing apparatus of system 100. In some examples, the hosting service may also be run in combination with one or more cloud computing resources. The hosting service may comprise hosting logic.

Preparation logic, described further below with respect to FIG. 3 for example, may run using an apparatus comprising one or more memory units and at least one processor.

One or more of the memory units or processors may be in a cloud-based environment. In an example, at least one of hypervisor 106 and host OS 104 are run in a cloud-based environment. In such an example, at least one of processor 108, trusted entity 110, guest OS 102a and guest OS 102b are run on a local computing system.

In some examples, processor 108 comprises a trusted entity 110. Trusted entity 110 comprises a subsystem that can be used to create, monitor and/or maintain a secure environment for system 100. Trusted entity 110 may be considered to be a secure subsystem. Trusted entity 110 may communicate with host OS 104, guest OS 102a and guest OS 102b via hypervisor 106. Host OS 104, guest OS 102a and guest OS 102b may communicate with trusted entity 110 via hypervisor 106.

According to some examples, trusted entity 108 may comprise a Platform Security Processor (PSP).

According to some examples, the method allows the Trusted Computing Base (TCB) of system 100 to be reduced to the entities in sections 126b and 126a of FIG. 1. As such, only the processor 108 (e.g. a CPU), trusted entity 110 and VMs running guest OSs 102a and 102b are required to be trusted by a user, such that hypervisor 106 and host OS are not required to be trusted by a user or be a part of the TCB of the system. This is useful in situations where a user may be dealing with confidential data (e.g. hospital records) that the user wishes to shield from the hypervisor 106 or host OS 104, and also reduces the surface area for attacks on the TCB of system 100.

When launching a pod of one or more containers in a VM (e.g. in guest OS 102a or guest OS 102b), a user is expected to provide the policy for the pod. As discussed above, the policy may define which containers will run, a set for one or more containers of read-only filesystem that compose the root file system of the one or more containers, rules for the run command line of the one or more containers, and the set of the user's encrypted filesystems that will be mounted during the execution of the container. The policy may define also further rules.

According to some examples, the filesystems that will be mounted during the execution of the container are encoded using a root hash, for example their dm-verity root hash. The integrity of the filesystem can be based on a Merkle tree that is constructed at the granularity of a block. The root hash of the tree may be stored in an encrypted memory address space of a VM of each guest OS. The root hash can be used for providing integrity of the Merkle tree, which may be stored in an unencrypted address space of the respective VM. The Merkle tree can be queried when a block of the filesystem is read by an application, which can ensure that the contents of the block being read have not been tampered with. In some examples, the filesystem may be read-only such that the root hash is kept constant during the lifetime of the filesystem. In some examples, users can include the root hash in policies that are enforced during container attestation as discussed below.

Figure 2:
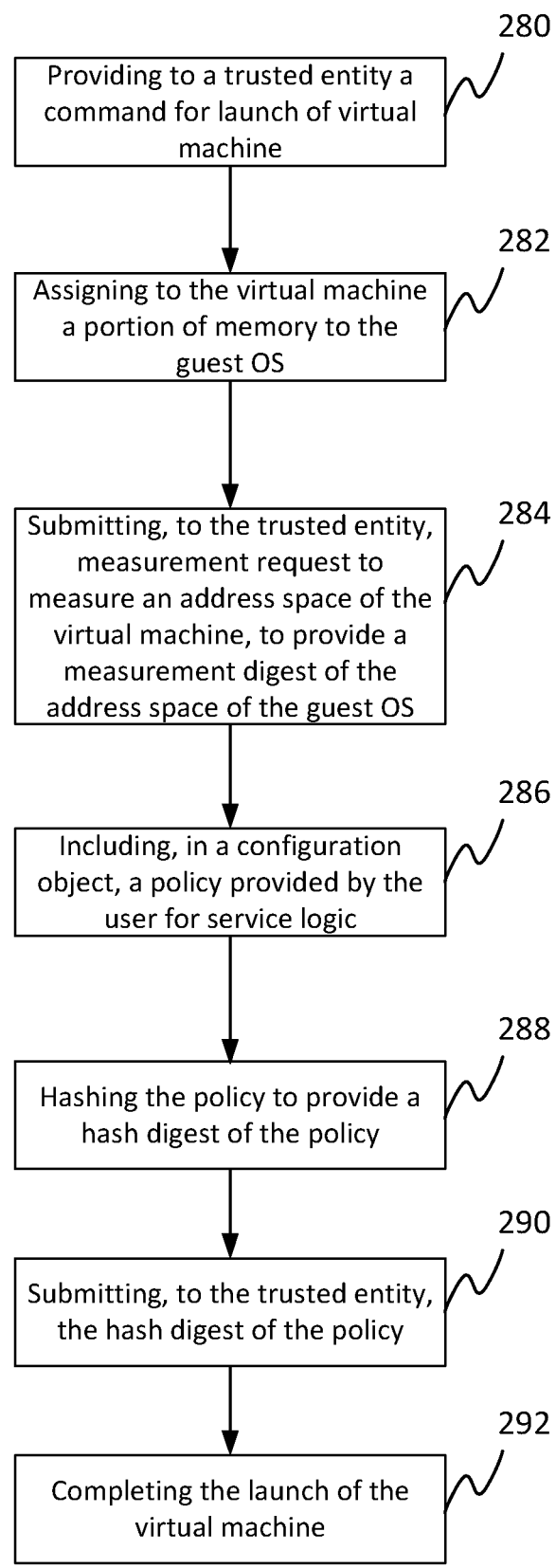
FIG. 2 is a flow chart of a method of launching a virtual machine in accordance with embodiments disclosed herein.

FIG. 2 shows an example of a method for launching a pod of containers securely in guest OS 102a. The method is carried out by a hosting service, where a hosting service comprises a combination of hosting logic 120, host OS 104 and hypervisor 106. In this example a method of launching a pod for a single guest OS, guest OS 102a, is described, however it will be understood that an analogous method could be applied to launch further pods of containers in other guest OSs, and also that an analogous methods may be used to launch a pod of containers securely in guest OS 102b. In some examples, a pod may comprise a VM and the OS running in the VM. The pod may be considered to give the containers memory to be run on. Further, FIGS. 3, 4 and 5 relate to guest OS 102a, but it will be understood that similar methods could be applied to other guest OSs such as guest OS 102b. It should be noted that although FIG. 2 has a particular order, in some examples the steps of the method may be performed in a different order or some of the steps may be performed simultaneously.

Once launched, a pod will host one or more containers in the pod's guest OS (guest OS 102a in this example). A container manager may launch the pod. In some examples, the container manager may run in the host OS (e.g. host OS 104) and interact with a lightweight container runtime (e.g. hscshim 121). When launching the pod, a user may provide a policy for service logic 116a. Alternatively, a previously defined policy for service logic 116a will be used. A container policy may comprise a vector of entries, with one entry for each container workload that will be hosted in the VM. Each entry may comprise at least one of: rules defining which containers will run; a set for one or more containers of read-only filesystem that compose the root file system of the one or more containers; rules for the run command line of the one or more containers; and the set of the user's encrypted filesystems that will be mounted during the execution of the container. Each entry may also comprise other rules.

In some examples, prior to 280 and when launching a pod, hosting logic 120 is asked to create a utility VM (e.g. guest OS 102a). This request may be a request from a lightweight container runtime (e.g. hcsshim 121) on behalf of a container manager (e.g. containerd), following the container manager's request to the lightweight container runtime to launch a pod i.

At 282, upon receipt of the request to create a utility VM, the hosting service launches guest OS 102a by submitting a launch command for guest OS 102a to trusted entity 110. In some examples, trusted entity 108 may comprise a Secure Encrypted Virtualization Secure Nested Paging (SEV-SNP) Platform Secure Processor (PSP) entity, comprising PSP firmware. In some examples, the launch command may comprise an SNP_LAUNCH_START command.

The launch command may cause trusted entity 110 to create a guest context for guest OS 102a. The launch command may cause trusted entity 110 to create a measurement digest of an address space of guest OS 102a. In some examples, a measurement digest may be created by a measurement operation. A measurement operation may comprise an operation that constructs a cryptographic digest of an arbitrary-sized chink of data using a cryptographic hash function (e.g. SHA-256 or SHA-512). Trusted entity 110 will then activate guest OS 102a to generate a memory encryption key for the VM of guest OS 102a.

At 282, the hosting service assigns at least a portion of memory in system 100 for guest OS 102a.

In some examples, at 282 a LCOW-OS image is loaded onto the portion of memory assigned by the hosting service. In some examples, a compatibility layer is also loaded onto the portion of memory assigned by the hosting service. The compatibility layer can be considered to be a collection of services that are loaded into a VM at a higher trusted layer (e.g. Virtual Machine Privilege Level (VMPL) 0) than the guest OS 102a (which are loaded at e.g. VMPL 3). The compatibility layer can be used to enable guest OS 102a to interact with the hypervisor, (e.g. hypervisor 108) without any modifications to guest OS 102a At 282, the compatibility layer may be assigned to a highest-trust-level memory region of the utility VM and the OS image is assigned to a lowest-trust-level memory region.

At 284, the hosting service submits a request to measure an address space of the utility VM of guest OS 102a to trusted entity 108. This request may trigger the trusted entity 108 to provide a measurement digest of the address space guest OS 102*a*. In some examples the trusted entity may measure each memory page of the utility VM of guest OS 102*a*.

In some examples, the request sent at 284 may also trigger trusted entity 108 to encrypt each memory page of the utility VM of guest OS 102*a*.

In some examples, trusted entity 108 may comprise a PSP and may use PSP firmware to measure and encrypt each memory page the utility VM of guest OS 102*a*.

In some examples, the request sent at 284 may comprise an SNP_LAUNCH_UPDATE command.

At 286, the hosting service may include, in a configuration object such as a configuration blob, a policy provided by the user for the service logic of guest OS 102*a*. In some examples, the policy may be formatted in JavaScript Object Notation (JSON), however any suitable format may be used. The policy defines one or more rules including at least one rule for which containers may run in the guest OS.

At 288, the hosting service hashes the policy to provide a hash digest of the policy. In some examples, this may comprise hashing the configuration object generated at 286. An SHA-256 hash may be used, but any other suitable hash function such as an SHA-512 could also be used.

At 290, the hosting service submits the hash digest of the policy to trusted entity 108. Once the launch of guest OS 102*a* is completed, the hash digest of the policy and the measurement digest of the address space of the guest OS 102*a* may be immutable in any attestation report for the virtual machine of guest OS 102*a*. In some examples, the hash digest of the policy of the service logic of the guest OS may be included in a HOST_DATA field of any attestation report during the lifetime of the utility VM of guest OS 102*a*. The submission at 290 may be performed using an SNP_LAUNCH_FINISH command. The hosting service may also send the configuration object to service logic 116*a*.

At 292, the hosting service completes the launch of the utility VM for guest OS 102*a*.

Following the launch at 292, service logic 116*a* may store the configuration object for use during attestation of any containers of the launched pod, where the configuration object is received by the service logic 116*a* from the hosting service.

Service logic 116*a* may then extract the policy for containers in guest OS 102*a* from the configuration object. Service logic 116*a* may then hash the extracted policy to generate a hash digest of the extracted policy. Any suitable hash method may be used, such as SHA-256, as long as the same hash method is used at 288.

In some examples, following the launch at 292, service logic 116*a* may retrieve an attestation report from trusted entity 108. Service logic 116*a* may then compare the hash digest of the extracted policy from the configuration object with the hash digest of the policy included in the attestation report received from the trusted entity 108. If the hash digest of the policy extracted from the configuration object matches the hash digest of the policy included in the attestation report received from the trusted entity 108, service logic 116*a* stores the policy so that service logic 116*a* can enforce the policy in guest OS 102*a* in any containers of guest OS 102*a*. For example, if the policy includes an expected root hash for one or more container images, the expected root hash can be enforced during container creation in guest OS 102*a*.

In some examples, following the method of FIG. 2, service logic 116*a* may mount the filesystems of a pause container for guest OS 102*a* and start the pause container. In doing so, a Merkle tree of the pause container layers are constructed by the hosting service, if they are not already available. In response, service logic 116*a* may mount the pause container's root filesystem as an overlay system from the union of the layers. An overlay system may comprise a logical filesystem which combines multiples filesystems to one unified filesystem. The layers are mounted as dm-verity read-only filesystems, which provides integrity of the root filesystem during the lifetime of the pause container.

The service logic 116*a* may then enforce the integrity of a container's image by checking a dm-verity root hash of each layer of the pause container against an expected root hash, which is hardcoded in service logic 116*a*. The expected root hash of the pause container may be hardcoded in service logic 116*a* by being set in the policy of service logic 116*a* as part of the rules for permitted container or by the service logic 116*a* being compiled with the expected hash digest of the pause container. This ensures that integrity-protected root filesystem matches the one expected by service logic 116*a*, and consequently by the user. In such examples, a new version of service logic 116*a* can be released whenever a pause container image is updated.

The service logic 116*a* may then provision a local key for encrypting the read-write scratch filesystem of the pause container.

Figure 3:
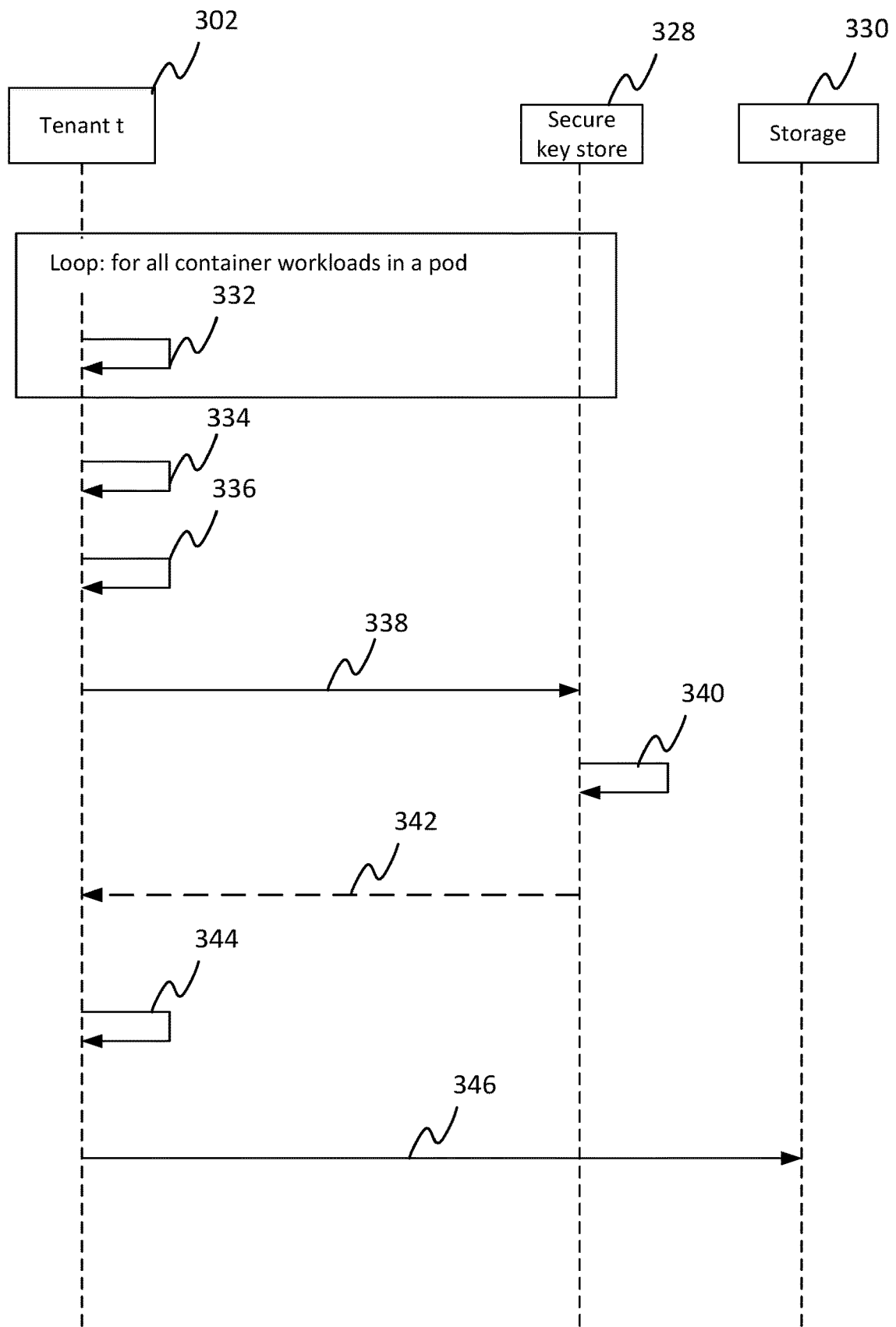
FIG. 3 is a flow diagram of a method of storing a user's filesystems in accordance with embodiments disclosed herein.
Figure 4:
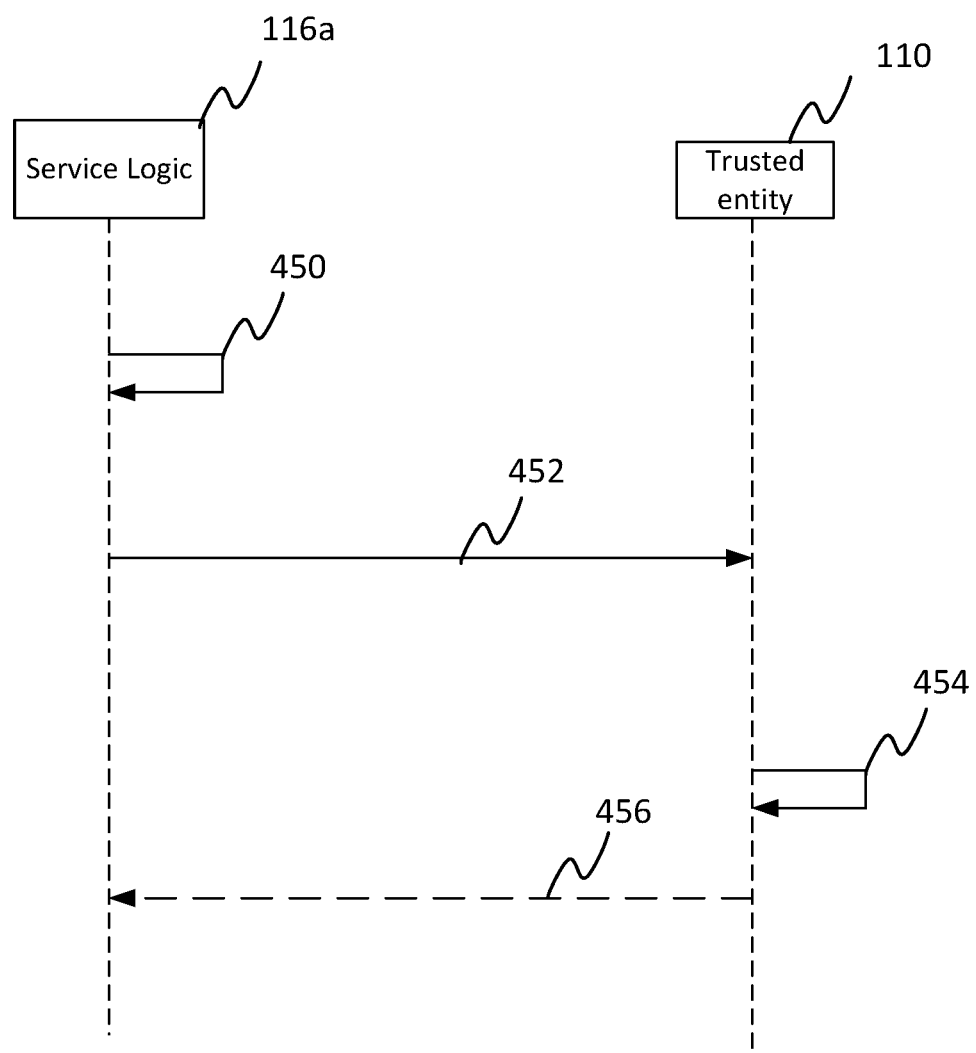
FIG. 4 is a flow diagram of a method of retrieving an attestation report in accordance with embodiments disclosed herein.
Figure 5:
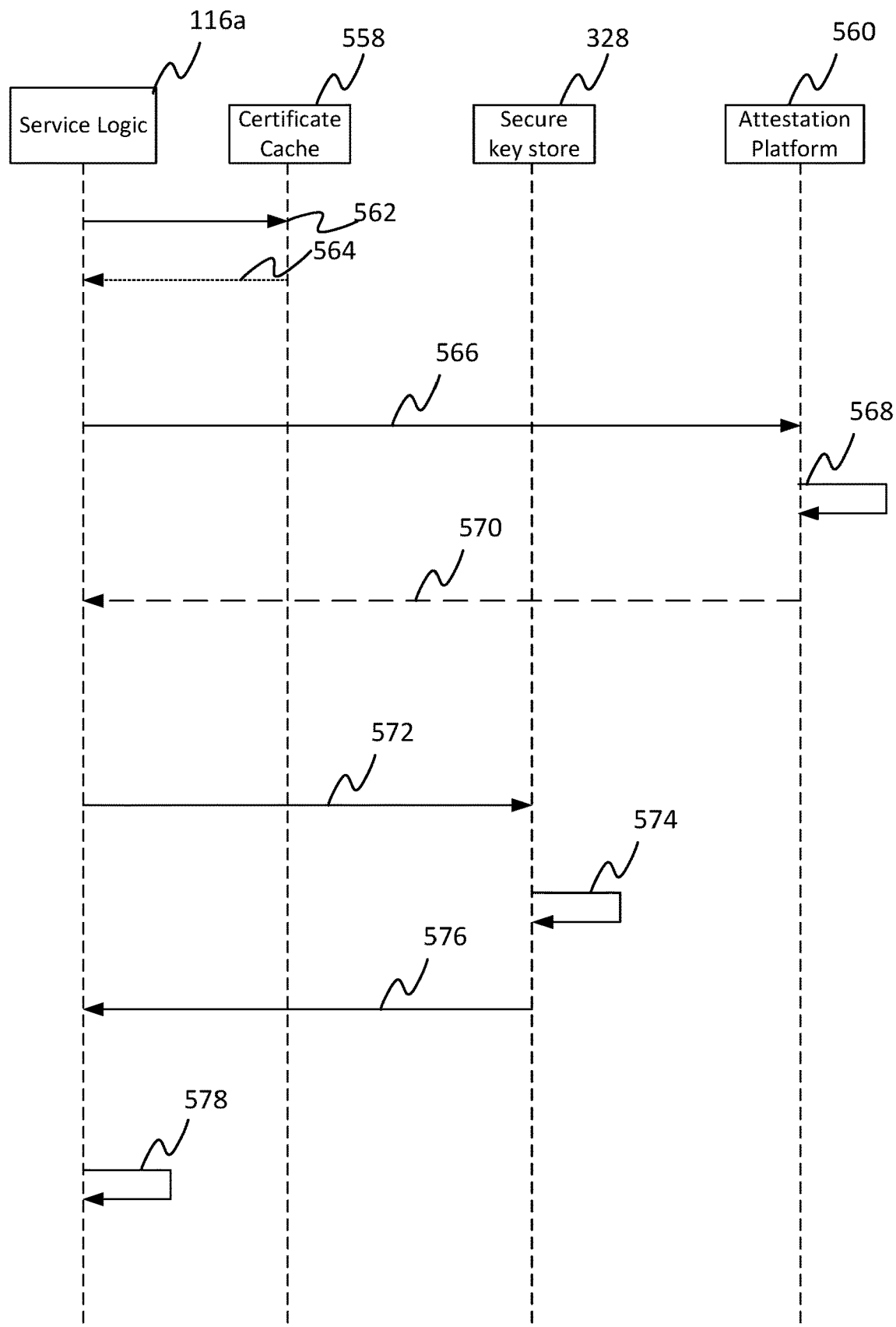
FIG. 5 is a flow diagram of a method of retrieving key information in accordance with embodiments disclosed herein.

FIGS. 3, 4 and 5 describe a method of remote attestation. FIG. 3 describes a preparation phase, FIG. 4 describes a quoting phase, and FIG. 5 describes an attestation phase.

Remote attestation issues evidence that a relying party (e.g. remote user/customer/tenant or an attestation platform/service) can use to verify that a container has been created and configured as expected. In some examples, the relying parties will use the issued evidence as a basis for provisioning encryption keys.

FIG. 3 shows a preparation phase carried out between: a Tenant, t, 302; a secure key store 328, which in some examples may comprise a managed Hardware Security Module (M-HSM); and a storage 330, which in some examples may include an Azure storage. Secure key store 328 and storage 330 may be accessible by system 100 via a network. A tenant t may be considered a user who performs the preparation phase. The preparation phase may be performed by the user in a separate machine to the other phases (e.g. the quoting phase and attestation phase below). The tenant's separate machine may comprise a trusted machine. In some examples, the trusted machine may run in the premises of the tenant. In other examples, the tenant may utilize a trusted VM running on a separate host machine. The tenant's machine may be a different machine to the host machine than runs guest OS 102*a* and 102*b*.

As discussed above, a policy may be defined for a tenant t (e.g. similar to guest OS 102*a*) which can be used for one or more containers C forming a pod. The policy may be named as P.

At 332, for each container, preparation logic of the tenant t 302 creates a container manifest $M_k$ which includes the run command and the dm-verity root hash of each layer of the container image. Tenant 302 also calculates the dm-verity root hashes of the encrypted read-only filesystems $F_k$ accessed by the container workload. The container and the root hashes of the encrypted filesystems are included in the policy for service logic 116*a*, $P_k$. A service logic policy $P^t$ may comprise multiple $P_k$ entries, one for each container workload that tenant 302 wishes to execute. A service logic policy may have a set of container workloads to run. For each container workload, an entry that includes the root hashes and a list of run commands is included in $P^t$.

At 334, tenant 302 creates a symmetric key sk$^t$ used for encrypting one or more filesystems for one or more container workloads in tenant 302. Any suitable symmetric key generation method can be used. For example, the symmetric key may be a random sample of 32 bytes.

At 336, tenant 302 generates a secure key release policy ψ which can be used for releasing the symmetric key. In some examples, secure key release policy ψ can be used for releasing a symmetric key to a Trusted Execution Environment (TEE) that has been configured to a state that meets the requirements of the secure key release policy ψ. For example, secure key release policy ψ may specify one or more requirements of: Software Version Number (SVN) of the platform and the PSP firmware in the system required for release of the symmetric key; the measurement of the address space of the guest OS image; the policy for the service logic in the tenant t. In some examples, these requirements must be met in order of the symmetric key to be released in the system. In some examples, secure key release policy ψ may be provided by a user according to their own requirements.

At 338, tenant 302 provisions the symmetric key sk$^t$ to secure key store 328. The symmetric key sk$^t$ may be provisioned to secure key store 328 along with the secure key release policy ψ. Secure key store 328 may not release symmetric key sk$^t$ unless all the one or more requirements of the key release policy are met.

At 340 secure key store 328 stores symmetric key sk$^t$ bound to the secure key release policy ψ.

In some examples, the method may comprise 342, where secure key store 328 signals to tenant 302 that the symmetric key sk$^t$ bound to the key release policy has been stored at secure key store 328.

At 344, tenant 302 encrypts one or more of a user's data filesystems F. These filesystems may comprise user secrets. A user may wish to hide these secrets from a hypervisor of the system (e.g. hypervisor 106), a host OS (e.g. host OS 104) and/or any manager of storage 330. It should be noted that although not shown in FIG. 3, instead of using sk$^t$ to encrypt filesystems directly, in some examples, sk$^t$ is used to encrypt data encryption keys. The date encryption keys are then used to encrypt each filesystem. A similar key release policy can be used to release sk$^t$ in such examples.

At 346, tenant 302 sends the encrypted one or more of a user's data filesystems F to be stored in storage 330. In response, storage 330 stores the encrypted one or more of a user's data filesystems F.

FIG. 4 shows a quoting phase of a remote attestation process.

At 450, service logic 116a of a utility VM provisions a key pair z, Z to use as a wrapping key when releasing customer secrets from a secure key store (such as secure key store 328). The wrapping key may comprise an RSA key pair, or any other suitable kind of key. The wrapping key may comprise an ephemeral key pair. The wrapping key may comprise a public key Z and a private key z.

At 450, service logic 116a generates key information based on the wrapping key. The key information may be based on a public key Z of the wrapping key. The key information may comprise a key object. The key information may comprise a key blob.

At 450, service logic 116a hashes the key information to provide a hash digest of the key information. The hash may comprise an SHA-256 digest or any other suitable kind of hash.

At 452, service logic 116a requests trusted entity 110 to generate a quote (e.g. an attestation report) from trusted entity 110, using the hash digest of the key information as an attribute in the request.

At 454, trusted entity 110 (which may, for example, comprise a PSP as discussed above) generates a quote Q using the hash digest of the key information as an attribute in the attestation report. The quote Q will also comprise the hash digest of the policy submitted to the trusted entity previously (e.g. at 290 above). The quote Q may also comprise the measurement digest of the address space of guest OS 102a. The quote Q may comprise an attestation report.

At 456, trusted entity 110 sends the generated attestation report to service logic 116a.

FIG. 5 shows an attestation phase of a remote attestation process.

At 562, service logic 116a requests, from a certificate cache 558, information of the hardware running service logic 116a. Certificate cache 558 may be accessible by system 100 via a network. Certificate information can be retrieved using a unique platform identification number (for example chip identifier number and/or platform version). The certificate information may comprise a hierarchy of public key certificates where each certificate is an electronic document used to prove the ownership of a public key. Typically, a root certificate is signed by the root certificate authority. A leaf certificate endorses the public key that is used for validating a signature of the attestation report. The certificate information may comprise a chip identifier number and/or a platform version of processor 108 assigned to the virtual machine of guest OS 102a.

According to some examples, certificate cache 558 may comprise an Azure Certificate Cache.

In some examples, the request sent at 562 may comprise a GET/SevSnpVM/certificates request.

At 564 certificate cache 558 sends the requested certificate information to service logic 116a.

At 566, service logic 116a sends, to attestation platform 560, the received certificate information and a quote Q received from a trusted entity (e.g. trusted entity 110). The quote Q may include an attestation report obtained previously by service logic 116a using a similar method as described with respect to FIG. 4 above.

At 566 service logic 116a may also send, to attestation platform 560, the key information (e.g. the public key provisioned at 450 above) previously hashed during attestation report retrieval (e.g. at 452 to 456 in FIG. 4 above)

At 566, service logic 116a may also send its policy information (i.e. the service logic policy).

According to some examples, attestation platform 560 may comprise a Microsoft Azure Attestation (MAA) platform.

At 568, attestation platform 560 verifies the quote Q received at 566. This may comprise verifying the attestation report.

At 568, attestation platform 560 validates the certificate information received at 566. Validating the certificate information may comprise checking one or more certificate revocation lists (CRLs) to check whether a certificate included in the certificate information has been revoked. In some examples, by retrieving a public key from a leaf certificate and validating the certificate chain so it is validated that the public key is rooted to a genuine and trustworthy root certification authority, impersonation attacks can be avoided.

At 568, attestation platform 560 may also check if the hash digest of the configuration information in the attestation report matches the hash digest of the configuration information provided at 566. To perform this check, attestation platform 560 may first perform a hash on the service logic policy received at 566. In examples where the policy defining one or more rules for the service logic is included in the configuration information, or the configuration information comprises only the policy defining one or more rules for the service logic of a virtual machine, attestation platform 560 may check if the hash digest of the policy in the attestation report matches the hash digest of the policy provided at 566. As noted above, the hash digest of the policy for the service logic may previously have been provided by a hosting service to trusted entity 110 (see step 290 above, for example). The hash digest of the policy for the service logic may be included as an immutable field in any attestation report provided for the virtual machine by the trusted entity 110, and as such would be included in any attestation report provided by trusted entity 110 to service logic 116*a*. For example, the hash digest of the policy could be included in the attestation report sent at 456 and would then be later available in the attestation report sent at 566. The configuration object comprising the policy sent at 566 and verified at 568 may previously have been received by service logic 116*a* from a hosting service as described above.

In some examples, the hash digest of policy for the service logic may be included in a HOST_DATA field of the attestation report sent at 566 and checked at 568.

At 568, attestation platform 560 may also check if the hash digest of key information included in the attestation report matches a hash digest of the key information received at 566. The hash digest of the key information may be included in the attestation report sent by service logic 116*a* from the trusted entity 110 at step 456. The attestation report may comprise a hash digest of the public key of the wrapping key.

In some examples, the hash digest of the key information may be included in a REPORT_DATA field of the attestation report sent at 566 and checked at 568.

If attestation platform 560 confirms that the certificate data, policy data and key information match that provided in the attestation report, such that the attestation report verification at 568 is successful, attestation platform may extract claims from the information received at 566. Attestation platform may extract one or more of: a platform version from the quote Q; a policy for service logic 116*a*; a measurement of guest OS 102*a*; the public key of the wrapping key included in the key information.

Attestation platform 560 may then construct a token that captures claims of service logic 116*a* from quote Q sent at 566. The token may comprise platform claims, which may comprise for example the extracted platform version of the hardware running guest OS 102*a*. The token may comprise runtime claims, which may comprise for example the public key of the wrapping key. The token may also comprise initialization time claims (init-time claims) which may comprise for example the policy for the service logic 116*a*. In some examples, the init-time claims may also comprise a measurement of guest OS 102*a*.

In some examples, the token may comprise a JSON Web Token (JWT).

At 570, attestation platform provides the token to service logic 116*a*.

At 572, service logic 116*a* sends the token to secure key store 328. Secure key store 328 may previously have stored a symmetric key for encrypting a user's data filesystems. The symmetric key is bound to a secure key release policy ψ, as discussed above with respect to FIG. 3. Due to the attestation report verification performed by attestation platform 560 above, secure key store 328 can trust that the token is valid.

At 574, secure key store 328 determines if the claims of the token satisfy the requirements of the secure key release policy. If so, at 576 secure key store 328 may release the symmetric key for decrypting the user's filesystems to service logic 116*a*. If the claims of the token do not satisfy the requirements of the secure key release policy, the secure key store may determine to not release the symmetric key.

At 576, secure key store 328 sends the symmetric key $sk^t$ for decrypting the user's filesystems to service logic 116*a*. In some examples, secure key store 328 may use the public key of the wrapping key to encrypt the symmetric key $sk^t$ when sending the symmetric key at 576.

At 578, service logic 116*a* may receive and store the symmetric key $sk^t$ for decrypting the user's filesystems. These filesystems may be stored in a storage such as e.g. storage 330.

If the symmetric key for decrypting the user's filesystems is encrypted (wrapped) using the public key of the wrapping key at 578, service logic 116*a* may decrypt (unwrap) the wrapped symmetric key $sk^t$ using the private key of the wrapping key.

It will be understood that in the above method diagrams of FIGS. 2, 3, 4 and 5, certain steps may be skipped or performed in a different order.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and non-volatile semiconductor memory (e.g. a solid-state drive or SSD).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

According to a first aspect there is provided a system comprising: memory comprising one or more memory units; a processing apparatus comprising one or processing units configured to run: service logic in a guest operating system of a virtual machine; and a hosting service, wherein the hosting service is configured to perform: providing, to a trusted entity on a central processing unit of the one or more processing units, a command for a launch of the virtual machine; assigning, to the virtual machine, at least a portion of the memory for the guest operating system; submitting, to the trusted entity, a request to measure an address space of the virtual machine to provide a measurement digest of the address space of the guest operating system; including, in a configuration object, a policy provided by the user for the service logic, wherein the policy for the service logic defines one or more rules for the service logic, wherein the one or more rules include at least one rule for which containers may run in the guest operating system; hashing the policy for the service logic to provide a hash digest of the policy for the service logic; submitting, to the trusted entity, the hash digest of the policy for the service logic; and completing the launch of the virtual machine.

In embodiments, the hash digest of the policy for the service logic and the measurement digest of the address space of the guest operating system are used by the system as immutable fields in any attestation reports for the virtual machine.

In embodiments, the hash digest of the policy for the service logic and the measurement digest of the address space of the guest operating system are immutable.

In embodiments, the policy for the service logic comprises at least one of: a definition for the service logic as to which containers are permitted to run in the guest operating system of the virtual machine; a set of hashes of container image layer file systems of the containers which are permitted to run in the guest operating system of the virtual machine; a command line rule for the containers which are permitted to run in the guest operating system of the virtual machine; a set of encrypted filesystems of the user that will be mounted during the execution of the containers which are permitted to run in the guest operating system of the virtual machine.

In embodiments, a Merkle tree over a filesystem is used, and the hash is a root hash of the Merkle tree.

In embodiments, the hosting service is arranged to send the configuration object to the service logic; and the service logic is configured to perform, in response to receiving the configuration object: storing the configuration object; extracting the policy for the service logic from the configuration object; hashing the extracted policy for the service logic to generate a hash digest of the extracted policy for the service logic; retrieving an attestation report from the trusted entity; checking if a hash digest of the policy for the service logic in the attestation report matches the hash digest of the extracted policy of the service logic; and storing the policy for the service logic to be enforced by the service logic in the guest operating system of the virtual machine.

In embodiments, the service logic is further configured to perform: during an attempt to run at least one container: making at least one read-write temporary encrypted filesystem for the at least one container, wherein the filesystem is integrity-protected; and mounting one or more integrity-protected filesystems of the at least one container; and only running the at least one container if a hash of one or more filesystem layers of the at least one container is the same as the expected hash reported in the policy for the service logic.

In embodiments, the service logic is configured to perform: checking if at least one run command line recorded in the policy for the service logic corresponds to a runtime specification of at least one container; executing a container workload of the at least one container when a run command line recorded in the policy for the service logic corresponds to the runtime specification of the at least one container; and not executing the container workload of the at least one container when the runtime specification of the at least one container does not correspond to at least one command line recorded in the policy for the service logic.

In embodiments, at least one of debugging and logging rules may be included in the policy for the service logic.

In embodiments, the processing apparatus comprising one or processing units is configured to run preparation logic, wherein the preparation logic is configured to perform: generating a symmetric key used for encrypting one or more filesystems for one or more container workloads; generating, in response to user input, a key release policy for releasing the symmetric key; sending the symmetric key and key release policy to a secure key store.

In embodiments, the preparation logic is run on a different system to the system of the first aspect, wherein the different system is accessible to the system of the first aspect via a network.

In embodiments, the preparation logic is configured to perform: encrypting the one or more filesystems using the symmetric key and storing the one or more encrypted filesystems in a storage.

In embodiments, the storage may be untrusted.

In embodiments, the service logic is configured to perform: provisioning a wrapping key for releasing user information from a secure key store, wherein the wrapping key includes a public key and a private key; generating key information based on the public key of the wrapping key; hashing the key information to provide a hash digest of the key information; requesting an attestation report from the trusted entity using the hash digest of the key information.

In embodiments, the service logic is further configured to perform: retrieving certificate information of the hardware running the virtual machine; sending the attestation report, certificate information, key information and the policy for the service logic to an attestation platform for attestation report verification, wherein the key information includes the public key of the wrapping key; when the attestation report verification succeeds, receiving a signed token from the attestation platform that includes information extracted from the attestation report, key information, and policy for the service logic.

In embodiments, the service logic is further configured to perform: sending the signed token to the secure key store requesting the symmetric key is released, wherein the secure key store releases the symmetric key if claims in the token meet the key release policy; when the claims meet the key release policy, receiving from the secure key store, the symmetric key wrapped with the public key of the wrapping key unwrapping the symmetric key using the private key of the wrapping key; and using the symmetric key to decrypt the one or more encrypted filesystems of the one or more container workloads.

According to a second aspect, there is provided a computer implemented method comprising the steps performed by the system of the first aspect and the steps performed by embodiments of the system. In an embodiment, the second aspect comprises a computer-implemented method comprising: providing, to a trusted entity on a central processing unit, a command for a launch of a virtual machine; assigning, to the virtual machine, at least a portion of the memory for the guest operating system; submitting, to the trusted entity, a request to measure an address space of the virtual machine to provide a measurement digest of the address space of the guest operating system; including, in a configuration object, a policy provided by the user for service logic in a guest operating system of the virtual machine, wherein the policy for the service logic defines one or more rules for the service logic, wherein the one or more rules include at least one rule for which containers may run in the guest operating system; hashing the policy for the service logic to provide a hash digest of the policy for the service logic; submitting, to the trusted entity, the hash digest of the policy for the service logic; and completing the launch of the virtual machine.

According to a third aspect, there is provided a computer-readable storage device comprising executable by a processor for executing the method of the second aspect. In an embodiment, the third aspect comprises a computer-readable storage device comprising executable by a processor for: providing, to a trusted entity on a central processing unit, a command for a launch of a virtual machine; assigning, to the virtual machine, at least a portion of memory for the guest operating system; submitting, to the trusted entity, a request to measure an address space of the virtual machine to provide a measurement digest of the address space of the guest operating system; including, in a configuration object, a policy provided by the user for service logic in a guest operating system of the virtual machine, wherein the policy for the service logic defines one or more rules for the service logic, wherein the one or more rules include at least one rule for which containers may run in the guest operating system; hashing the policy of the service logic to provide a hash digest of the policy for the service logic; submitting, to the trusted entity, the hash digest of the policy for the service logic; and completing the launch of the virtual machine.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

What is claimed is:

1. A system comprising:
    a memory; and
    a processor configured to run service logic in a guest operating system of a virtual machine and a hosting service, wherein the processor runs the hosting service to perform:
        providing, to a trusted entity on a central processing unit of the processor, a command for a launch of the virtual machine;
        assigning, to the virtual machine, at least a portion of the memory for the guest operating system;
        submitting, to the trusted entity, a request to measure an address space of the virtual machine to provide a measurement digest of the address space of the guest operating system;
        including, in a configuration object, a policy provided by a user for the service logic, wherein the policy for the service logic defines a rule for the service logic, wherein the rule indicates which container may run in the guest operating system;
        hashing the policy for the service logic to provide a hash digest of the policy;
        submitting, to the trusted entity, the hash digest of the policy for the service logic; and
        completing the launch of the virtual machine.

2. The system as claimed in claim 1, wherein the hash digest of the policy for the service logic and the measurement digest of the address space of the guest operating system are used by the system as immutable fields in any attestation reports for the virtual machine.

3. The system as claimed in claim 1, wherein the policy for the service logic comprises at least one of:
    a definition for the service logic as to which containers are permitted to run in the guest operating system of the virtual machine;
    a set of hashes of container image layer file systems of the containers which are permitted to run in the guest operating system of the virtual machine;
    a command line rule for the containers which are permitted to run in the guest operating system of the virtual machine; or
    a set of encrypted filesystems of the user that will be mounted during execution of the containers which are permitted to run in the guest operating system of the virtual machine.

4. The system as claimed in claim 3, wherein the processor runs the hosting service to send the configuration object to the service logic;
    wherein the processor runs the service logic to perform, in response to receiving the configuration object:
        storing the configuration object;
        extracting the policy for the service logic from the configuration object;
        hashing the extracted policy for the service logic to generate a hash digest of the extracted policy;
        retrieving an attestation report from the trusted entity;
        checking if a hash digest of the policy for the service logic in the attestation report matches the hash digest of the extracted policy of the service logic; and
        storing the policy for the service logic to be enforced by the service logic in the guest operating system of the virtual machine.

5. The system as claimed in claim 4, wherein the processor runs the service logic to perform:
    during an attempt to run a container:
        making a read-write temporary encrypted filesystem for the container, wherein the filesystem is integrity-protected;
        mounting an integrity-protected filesystem of the container; and
        only running the container if a hash of a filesystem layer of the container is the same as an expected hash reported in the policy for the service logic.

6. The system as claimed in claim 1, wherein the processor runs the service to perform:
    checking if a run command line recorded in the policy for the service logic corresponds to a runtime specification of a container;
    executing a container workload of the container when the run command line recorded in the policy for the service logic corresponds to the runtime specification of the container; and not executing the container workload of the container when the runtime specification of the container does not correspond to the run command line recorded in the policy for the service logic.

7. The system as claimed in claim 1, wherein the processor is configured to run preparation logic, wherein the processor runs the preparation logic to perform:
generating a symmetric key used for encrypting a filesystem for a container workload;
generating, in response to user input, a key release policy for releasing the symmetric key; and
sending the symmetric key and the key release policy to a secure key store.

8. The system as claimed in claim 7, wherein the processor runs the preparation logic to perform:
encrypting the filesystem using the symmetric key and storing the encrypted filesystem in a storage.

9. The system as claimed in claim 8, wherein the processor runs the service logic to perform:
provisioning a wrapping key for releasing user information from a secure key store, wherein the wrapping key includes a public key and a private key;
generating key information based on the public key of the wrapping key;
hashing the key information to provide a hash digest of the key information; and
requesting an attestation report from the trusted entity using the hash digest of the key information.

10. The system as claimed in claim 9, wherein the processor runs the service logic to perform:
retrieving certificate information of hardware running the virtual machine;
sending the attestation report, certificate information, key information and the policy for the service logic to an attestation platform for attestation report verification, wherein the key information includes the public key of the wrapping key; and
upon the attestation report verification succeeding, receiving a signed token from the attestation platform that includes information extracted from the attestation report, key information, and the policy for the service logic.

11. The system as claimed in claim 10, wherein the processor runs the service logic to perform:
sending the signed token to the secure key store requesting the symmetric key is released, wherein the secure key store releases the symmetric key if claims in the token meet the key release policy;
upon the claims meeting the key release policy, receiving from the secure key store, the symmetric key wrapped with the public key of the wrapping key;
unwrapping the symmetric key using the private key of the wrapping key; and
using the symmetric key to decrypt the encrypted filesystem of the container workload.

12. A computer-implemented method comprising:
providing, to a trusted entity on a central processing unit, a command for a launch of a virtual machine;
assigning, to the virtual machine, at least a portion of memory for a guest operating system;
submitting, to the trusted entity, a request to measure an address space of the virtual machine to provide a measurement digest of the address space of the guest operating system;
including, in a configuration object, a policy provided by a user for service logic in a guest operating system of the virtual machine, wherein the policy for the service logic defines a rule for the service logic, wherein the indicates which container may run in the guest operating system;
hashing the policy for the service logic to provide a hash digest of the policy for the service logic;
submitting, to the trusted entity, the hash digest of the policy for the service logic; and
completing the launch of the virtual machine.

13. The method as claimed in claim 12, wherein the hash digest of the policy for the service logic and the measurement digest of the address space of the guest operating system are used as immutable fields in any attestation reports for the virtual machine.

14. The method as claimed in claim 12, wherein the policy for the service logic comprises at least one of:
a definition for the service logic as to which containers are permitted to run in the guest operating system of the virtual machine;
a set of hashes of container image layer file systems of the containers which are permitted to run in the guest operating system of the virtual machine;
a command line rule for the containers which are permitted to run in the guest operating system of the virtual machine; or
a set of encrypted filesystems of the user that will be mounted during execution of the containers which are permitted to run in the guest operating system of the virtual machine.

15. The method as claimed in claim 14, comprising:
a hosting service sending the configuration object to the service logic; and the service logic, in response to receiving the configuration object, performing:
storing the configuration object;
extracting the policy for the service logic from the configuration object;
hashing the extracted policy for the service logic to generate a hash digest of the extracted policy;
retrieving an attestation report from the trusted entity;
checking if a hash digest of the policy for the service logic in the attestation report matches the hash digest of the extracted policy of the service logic; and
storing the policy for the service logic to be enforced by the service logic in the guest operating system of the virtual machine.

16. The method as claimed in claim 15, comprising the service logic performing, during an attempt to run a container:
making a read-write temporary encrypted filesystem for the container, wherein the filesystem is integrity-protected;
mounting an integrity-protected filesystem of the container; and
only running the container if a hash of a filesystem layer of the container is the same as an expected hash reported in the policy for the service logic.

17. The method as claimed in claim 12, comprising the service logic performing:
checking if a run command line recorded in the policy for the service logic corresponds to a runtime specification of a container;
executing a container workload of the container when a run command line recorded in the policy for the service logic corresponds to the runtime specification of the container; and
not executing the container workload of the container when the runtime specification of the container does not correspond to the run command line recorded in the policy for the service logic.

18. The method as claimed in claim 12, comprising a preparation logic performing:
  generating a symmetric key used for encrypting a filesystem for a container workload;
  generating, in response to user input, a key release policy for releasing the symmetric key; and
  sending the symmetric key and the key release policy to a secure key store.

19. The method as claimed in claim 18, comprising the preparation logic performing:
  encrypting the filesystem using the symmetric key and storing the encrypted filesystem in a storage.

20. A non-transitory computer-readable storage device comprising executable by a processor for:
  providing, to a trusted entity on a central processing unit, a command for a launch of a virtual machine;
  assigning, to the virtual machine, at least a portion of memory for a guest operating system;
  submitting, to the trusted entity, a request to measure an address space of the virtual machine to provide a measurement digest of the address space of the guest operating system;
  including, in a configuration object, a policy provided by a user for service logic in a guest operating system of the virtual machine, wherein the policy for the service logic defines a rule for the service logic, wherein the rule indicates which container may run in the guest operating system;
  hashing the policy of the service logic to provide a hash digest of the policy for the service logic;
  submitting, to the trusted entity, the hash digest of the policy for the service logic; and
  completing the launch of the virtual machine.

* * * * *